(12) United States Patent
Feng et al.

(10) Patent No.: US 11,087,346 B2
(45) Date of Patent: Aug. 10, 2021

(54) RETRIEVING VALUES OF DIGITAL TICKETS USING SMART CONTRACTS IN BLOCKCHAIN NETWORKS

(71) Applicant: Advanced New Technologies Co., Ltd., Grand Cayman (KY)

(72) Inventors: Zhiyuan Feng, Hangzhou (CN); Yanpeng Li, Hangzhou (CN); Long Cheng, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/671,032

(22) Filed: Oct. 31, 2019

(65) Prior Publication Data
US 2020/0327569 A1    Oct. 15, 2020

Related U.S. Application Data

(63) Continuation of application No. PCT/CN2019/082541, filed on Apr. 12, 2019.

(51) Int. Cl.
*G06Q 30/02* (2012.01)

(52) U.S. Cl.
CPC ............... *G06Q 30/0207* (2013.01)

(58) Field of Classification Search
CPC ............ G06Q 30/02; G06Q 30/0207
See application file for complete search history.

(56) References Cited

U.S. PATENT DOCUMENTS 9,092,783 B2 * 7/2015 Guday ............... G06Q 30/0211
10,600,009 B1 * 3/2020 Augustine ........... G06Q 30/02
(Continued)

FOREIGN PATENT DOCUMENTS

CN    107146101    9/2017
CN    108241979    7/2018
(Continued)

OTHER PUBLICATIONS

Crosby et al., "BlockChain Technology: Beyond Bitcoin," Sutardja Center for Entrepreneurship & Technology Technica Report, Oct. 16, 2015, 35 pages.
(Continued)

*Primary Examiner* — Thuy N Nguyen
(74) *Attorney, Agent, or Firm* — Fish & Richardson P.C.

(57) ABSTRACT

Disclosed herein are methods, systems, and apparatus, including computer programs encoded on computer storage media, for retrieval of values of digital tickets. One of the methods includes receiving a request from a client device for a current value of a digital ticket by a distributing node. The request includes the digital ticket and one or more value changing rules for determining the current value of the digital ticket. The distributing node retrieves a smart contract from a blockchain network in response to the request from the client device. The smart contract includes the one or more value changing rules for determining the current value of the digital ticket. The distributing node determines the current value of the digital ticket based on an original value of the digital ticket and the one or more value changing rules by executing the smart contract, and associates the current value with the digital ticket.

21 Claims, 6 Drawing Sheets

(56) References Cited

U.S. PATENT DOCUMENTS

| | | | |
|---|---|---|---|
| 2002/0010627 A1* | 1/2002 | Lerat | G06Q 30/02 705/14.26 |
| 2008/0052169 A1* | 2/2008 | O'Shea | G06Q 30/02 705/14.17 |
| 2009/0061884 A1* | 3/2009 | Rajan | G06Q 30/0225 455/445 |
| 2010/0185504 A1* | 7/2010 | Rajan | G06Q 30/02 705/14.13 |
| 2012/0084137 A1* | 4/2012 | Shimogori | G06Q 30/0239 705/14.39 |
| 2012/0150746 A1* | 6/2012 | Graham | G06Q 30/02 705/50 |
| 2012/0310719 A1* | 12/2012 | Hammerstad | G06Q 30/0207 705/14.25 |
| 2013/0073372 A1* | 3/2013 | Novick | G06Q 30/02 705/14.36 |
| 2013/0268335 A1* | 10/2013 | Cooper | G06Q 30/0217 705/14.19 |
| 2013/0325575 A1* | 12/2013 | Byrd | G06Q 30/02 705/14.23 |
| 2014/0180808 A1* | 6/2014 | Boal | G06Q 30/0245 705/14.53 |
| 2014/0278878 A1* | 9/2014 | Wiegand | G06Q 30/0233 705/14.25 |
| 2015/0100398 A1* | 4/2015 | Narayanaswami | G06Q 30/0236 705/14.16 |
| 2015/0379554 A1* | 12/2015 | Copeland | G06Q 30/0239 705/14.39 |
| 2017/0140408 A1* | 5/2017 | Wuehler | G06Q 30/0207 |
| 2017/0236143 A1 | 8/2017 | Code et al. | |
| 2017/0345079 A1* | 11/2017 | Rangan | G06Q 30/0633 |
| 2018/0089707 A1* | 3/2018 | Sills | G06Q 10/067 |
| 2018/0101844 A1 | 4/2018 | Song et al. | |
| 2018/0268401 A1* | 9/2018 | Ortiz | G06Q 20/204 |
| 2019/0012695 A1 | 1/2019 | Bishnoi et al. | |
| 2019/0057362 A1* | 2/2019 | Wright | G06Q 20/065 |
| 2019/0073666 A1* | 3/2019 | Ortiz | H04L 9/3236 |
| 2019/0180329 A1* | 6/2019 | Chetlur | G06Q 30/0269 |
| 2019/0188653 A1* | 6/2019 | Khaund | G06Q 20/045 |
| 2019/0228461 A1* | 7/2019 | Domokos | G06Q 20/3223 |
| 2020/0005281 A1* | 1/2020 | Patel | G06Q 20/0655 |
| 2020/0051368 A1* | 2/2020 | Pustizzi | H04L 63/00 |
| 2020/0167829 A1* | 5/2020 | Teckenburg | G06Q 30/0277 |
| 2020/0226630 A1* | 7/2020 | Balfour | G06Q 20/387 |

FOREIGN PATENT DOCUMENTS

| | | |
|---|---|---|
| CN | 109214792 | 1/2019 |
| WO | WQ-2012140653 A1 * | 4/2012 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2019/082541, dated Jan. 3, 2020, 7 pages.

European Extended Search Report in European Appln No. 19732232.4, dated May 13, 2020, 9 pages.

Tackmann et al, "Secure Event Tickets on a Blockchain," International Conference on Financial Cryptography and Data Security, Sep. 12, 2017, 8 pages.

Agrawal et al, "Loyalty Points on the Blockchain," Redframe Publishing, Sep. 2019, 13 pages.

* cited by examiner

RETRIEVING VALUES OF DIGITAL TICKETS USING SMART CONTRACTS IN BLOCKCHAIN NETWORKS

CROSS-REFERENCE TO RELATED APPLICATIONS

This application is a continuation of PCT Application No. PCT/CN2019/082541, filed on Apr. 12, 2019, which is hereby incorporated by reference in its entirety.

TECHNICAL FIELD

This specification relates to retrieving values of digital tickets using smart contracts in blockchain networks.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

The blockchain networks can be used for implementing electronic trading systems or platforms. The electronic trading systems may distribute electronic coupons to consumers for promotional purposes. The electronic coupons have penetrated into all aspects of merchant products and services and can be redeemed by consumers for purchasing products or services on an electronic trading platform. Examples of the electronic coupons (or promotional coupons) include discount coupons which can be used by consumers at the time of consumption to purchase a product at a discounted price according to a discount rate indicated by the discount coupons, and electronic vouchers that have certain monetary values and can be exchanged for goods and services.

In some instances, the electronic coupons are associated with a value (e.g., a discount rate of a discount coupon, or a monetary value of an electronic voucher) that can be redeemed at a specific time point or within a short time window. As a result, consumers tend to redeem the electronic coupons at a same time or within a short time window, thereby increasing pressure on the computer systems that process the requests from the consumers to redeem the electronic coupons. Furthermore, information stored in the electronic coupons (e.g., a discount rate of a discount coupon, or a monetary value of an electronic voucher) may be tampered with unauthorized alternations and it is difficult to trace back the unauthorized alternations, which can result in data corruption issues.

Therefore, more secure and efficient solutions for implementing electronic trading platforms would be desirable.

SUMMARY

This specification describes technologies for dynamically determining values of digital tickets using smart contracts in a blockchain network. These technologies generally involve determining a current value of a digital ticket (e.g., an electronic coupon) based on one or more value changing rules using a smart contract from a blockchain network. In some embodiments, a client can submit a request to a ticket distributing node (e.g., an electronic trading platform) to redeem a digital ticket having an original value, where the request includes the digital ticket and one or more value changing rules specified by the user. The one or more value changing rules can include predetermined rules for determining a current value of the digital ticket based on factors such as a date to redeem the digital ticket, or a location to redeem to digital ticket. For example, a digital ticket can have different current values when it is redeemed at different dates, or at different locations. The ticket distributing node receives the request from the client and retrieves a smart contract from the blockchain network. The smart contract includes a number of value changing rules. The one or more value changing rules specified by the user in the request is a subset of the value changing rules in the smart contract. The ticket distributing node can then execute the smart contract to determine a current value of the digital ticket by applying the one or more value changing rules on the original value of the digital ticket.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

DETAILED DESCRIPTION

This specification describes technologies for dynamically determining values (e, g, a discount rate, a monetary value) of digital tickets (e.g., an electronic discount coupon, an electronic voucher, an electronic gift certificate) using smart contracts from a blockchain network. These technologies generally involve determining a current value of a digital ticket based on one or more value changing rules using a smart contract from a blockchain network. In some embodiments, a client can submit a request to a ticket distributing node (e.g., an electronic trading platform) to redeem a digital ticket having an original value, where the request includes the digital ticket and one or more value changing rules specified by the user. The one or more value changing rules can include predetermined rules for determining a current value of the digital ticket based on factors such as a date to redeem the digital ticket, or a location to redeem to digital ticket. For example, a digital ticket can have different current values when it is redeemed at different dates, or at different locations. The ticket distributing node receives the request from the client and retrieves a smart contract from the blockchain network. The smart contract includes a number of value changing rules. The one or more value changing rules specified by the user in the request is a subset of the value changing rules in the smart contract. The ticket distributing node can then execute the smart contract to determine a current value of the digital ticket by applying the one or more value changing rules on the original value of the digital ticket.

The embodiments described in this specification as implemented in particular embodiments realize one or more of the following technical effects. The values of digital tickets can be dynamically determined based on different value changing rules specified by users. In some embodiments, a digital ticket can reach a maximum value at different dates, or at different locations based on the value changing rules specified by the users in the request. This facilitates encouraging the users to redeem the digital tickets at different dates or locations, thereby alleviating the pressure on the computer systems that process the requests from the users to redeem the digital tickets. Furthermore, the values of the digital tickets can be determined using a smart contract from the blockchain network. The smart-contract can be used to implement trusted transactions that are trackable, irreversible, and tamper resistant, without involving the third parties. This ensures a secure and trusted value determining process for the digital tickets. The autonomous execution capacities of smart contracts extends the transactional security assurance of blockchain into situations where complex and dynamic value retrieval of the digital tickets are needed. In some cases, the smart contracts can be executed without a third party (e.g., without an arbitrating program or an intermediary program) in between the clients and the distributing node for retrieving values of the digital tickets. This approach can save computing and network resources (e.g., network bandwidth) for the value retrieval process.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

Figure 1:
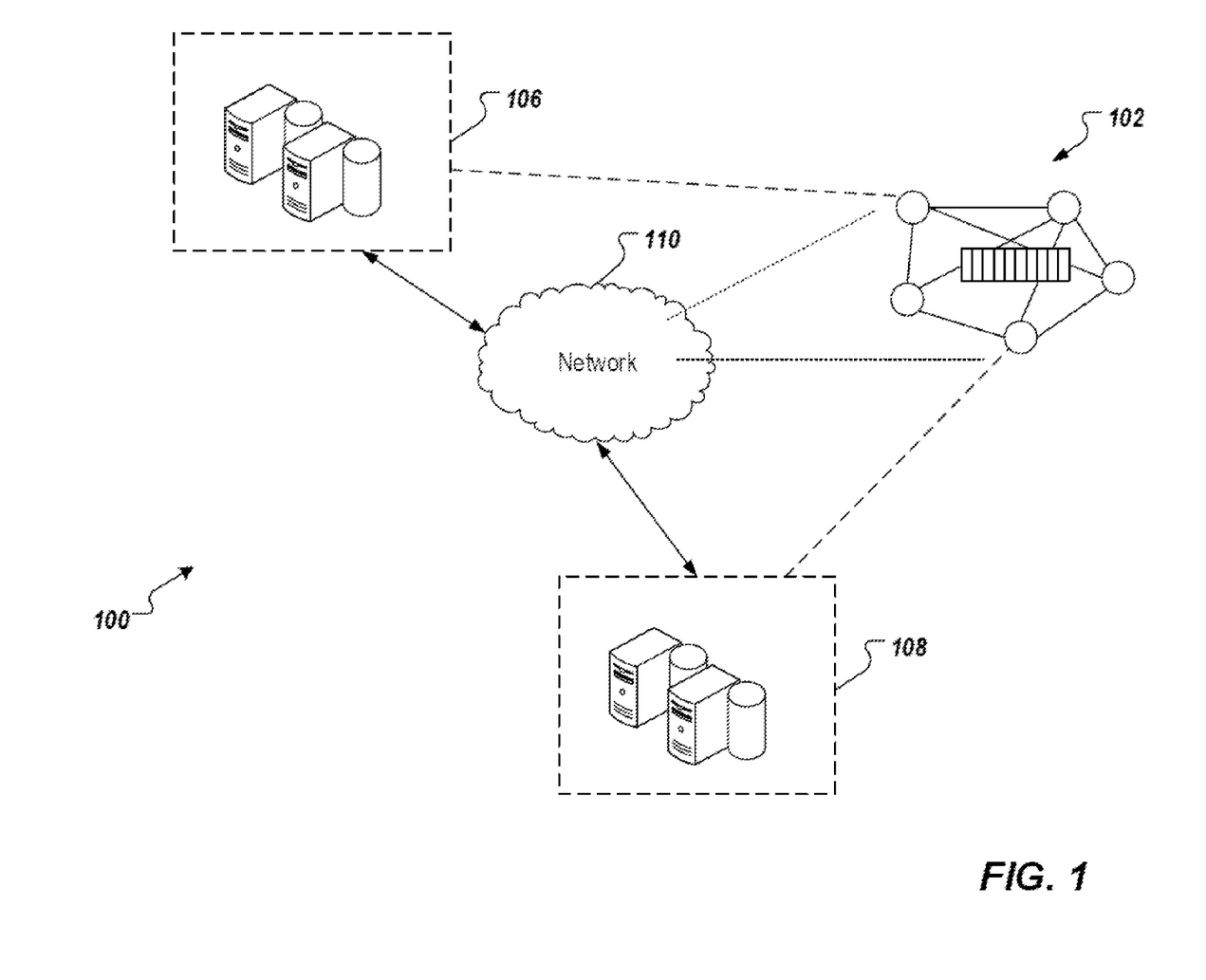
FIG. 1 is a diagram illustrating an example of an environment that can be used to execute embodiments of this specification.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing devices 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing devices 106, 108 host one or more computer-implemented services for interacting with the consortium blockchain network 102. For example, the computing device 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing devices 106, 108 provide nodes of the first entity, and second entity respectively, which participate in the consortium blockchain network 102.

Figure 2:
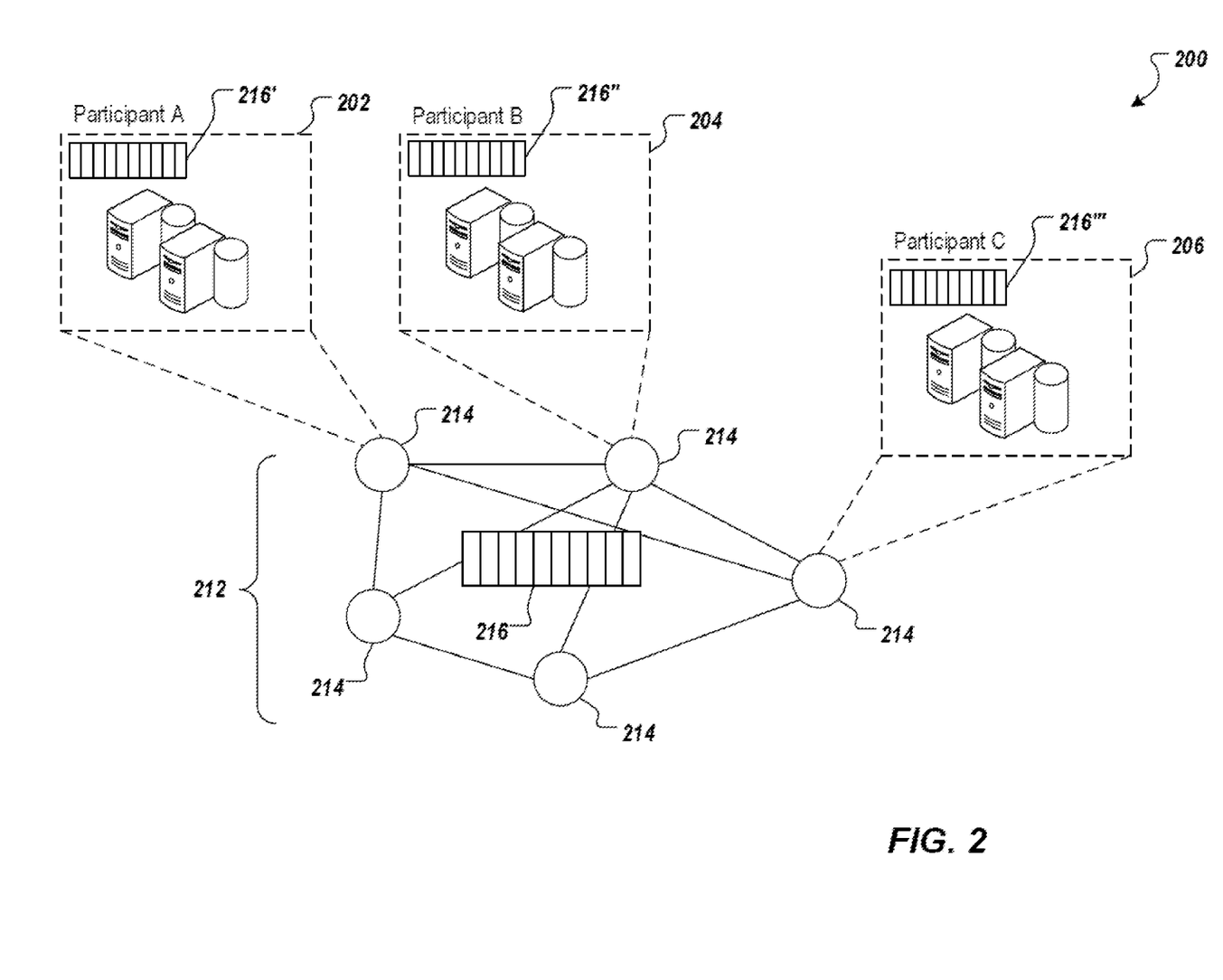
FIG. 2 is a diagram illustrating an example of a conceptual architecture in accordance with embodiments of this specification.

FIG. 2 depicts an example of a conceptual architecture 200 in accordance with embodiments of this specification. The conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204 store respective, complete copies 216', 216" of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

Figure 3:
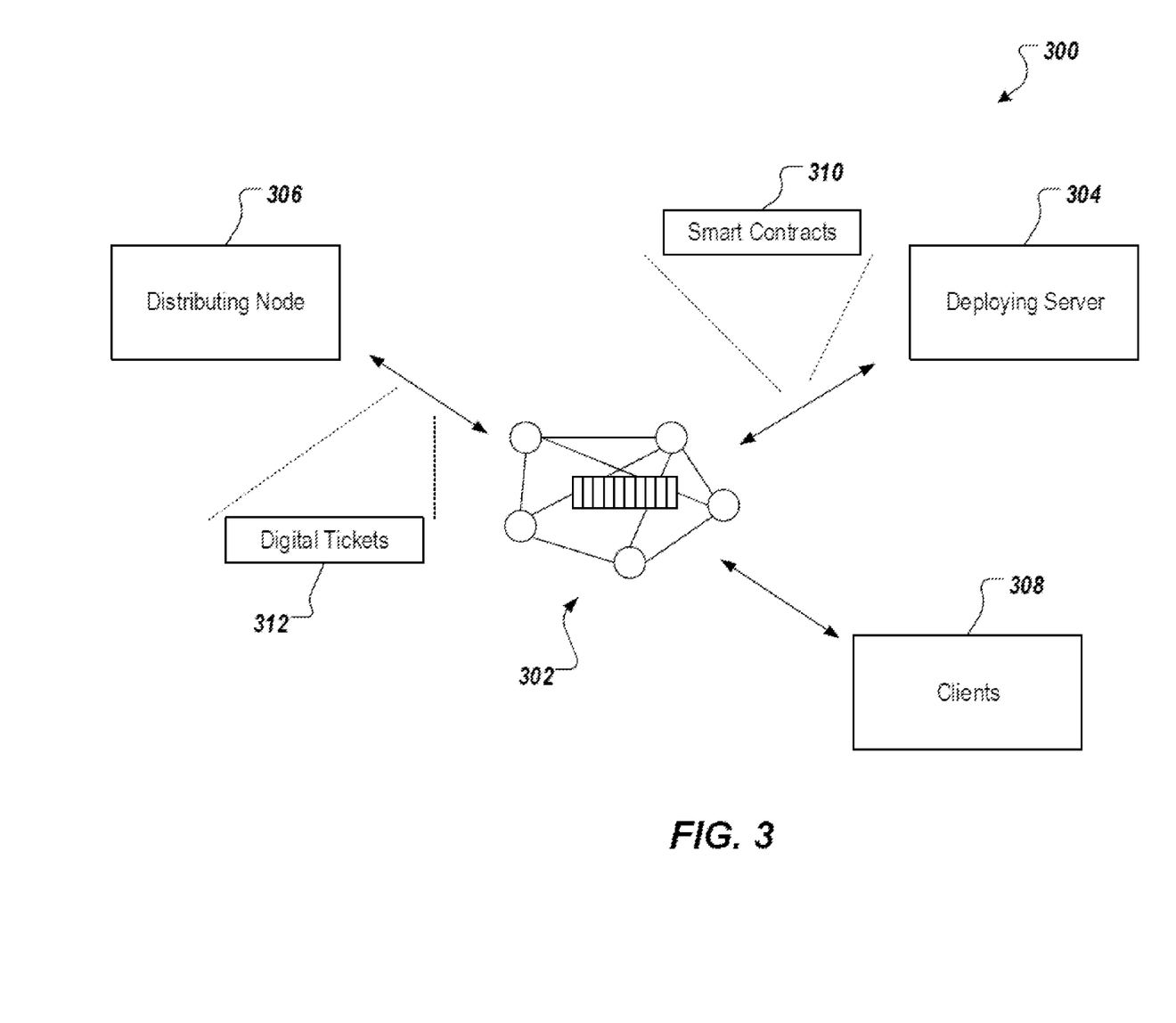
FIG. 3 is a diagram illustrating an example of a system in accordance with embodiments of this specification.

The blockchain networks as described herein can be used for implementing electronic trading systems or platforms. The electronic trading systems may distribute digital tickets (e.g., electronic coupons) to consumers for promotional purposes. The digital tickets can have a value (e.g., a discount rate of a discount coupon, or a monetary value of an electronic voucher) which can be redeemed by consumers for purchasing products or services on an electronic trading platform. FIG. 3 is a diagram illustrating an example of a system 300 that retrieves a current value of a digital ticket using a smart contract from a blockchain network. As shown, the system 300 includes a blockchain network 302, a deploying server 304, a distributing node 306, and clients 308 (e.g., client computing devices). In general, the deploying server 304 deploys smart contracts 310 to the blockchain network 302 and the distributing node 306 distributes digital tickets 312 to the clients 308. The digital tickets 312 are generated based on the smart contracts 310 such that values of the digital tickets 312 can be dynamically determined by executing value changing rules in the smart contracts 310.

The deploying server 304 can be any suitable server, computer, module, or computing element programmed to perform the methods described in this specification. In some embodiments, the deploying server 304 in operation creates the smart contracts 310 and deploys the smart contracts 310 to the blockchain network 302. In some embodiments, the deploying server 304 can set up one or more dynamic ticket templates in the smart contracts 310 that can be used for creating the digital tickets 312. The deploying server 304 can define rules in the dynamic ticket templates for dynamically determining values of the digital tickets 312. The deploying server 304 can further add more templates to the smart contracts 310 upon request. Some examples of the rules in the smart contract 310 include increasing value of a digital ticket 312 as time passes, assigning a certain value to the digital ticket during a specified time period, among others.

The distributing node 306 can generate digital tickets 312 based on the smart contracts 310. In some examples, the distributing node 306 can register accounts in a smart contract 310 and use the dynamic ticket templates in the smart contract 310 to generate the digital tickets 312. In some examples, a digital ticket 312 can have a form of an electronic voucher, a digital token, or an electronic coupon, among others. Each digital ticket 312 can includes one or more rules for determining the values of the digital ticket 312. After generation, the digital tickets 312 can be stored in the blockchain network 302 in a distributed manner.

The clients 308 can request (e.g., purchase) one or more of digital tickets 312 from the distributing node 306 and obtain the digital tickets 312. In some examples, the clients 308 can inspect each of the digital tickets 312 for the rules included in each of the digital tickets 312. The clients 308 can choose one or more of the rules in a digital ticket 312 to apply to a digital ticket 312 for a value of the digital ticket 312. In some embodiments, the clients 308 can submit a request to the distributing node 306 for redeeming a value of a digital ticket 312 and the distributing node 306 can make a smart contract call to determine the value of the digital ticket 312.

In operation, the deploying server 304 generates smart contracts 310 that each include one or more dynamic ticket templates and deploys the smart contracts 310 to the blockchain network 302. The distributing node 306 registers account in the smart contracts 310 and generates digital tickets 312 based on the smart contracts 310. The distributing node 306 distributes the digital tickets to the clients 308. The clients 308 obtain the digital tickets 312 and inspect rules in the digital tickets 312. Each client 308 selects one or more of the rules that are applied to the digital ticket 312 for determining a value of the digital ticket 312. The client 308 submits the digital ticket 312 and the selected rule(s) to the distributing node 306 for redeeming the value of the digital ticket 312. The distributing node 306 receives the digital ticket 312 along with the selected rule(s) and makes a smart contract call. The distributing node 306 uses the called smart contract 310 and the selected rule(s) to determine the value of the digital ticket 312. The distributing node 306 endows the determined value to the digital ticket 312 and the client 308 can use the endowed ticket. The value determination of the digital tickets 312 will be discussed below in greater detail with reference to FIG. 4.

In some embodiments, distributing entities that distribute the digital tickets 312 and receiving entities that receive the digital tickets 312 are entities that are defined in the smart contracts 310 and that are external to the blockchain network. In some examples, values of the digital tickets 312 increase or decrease linearly based on the rules of the digital tickets 312. For example, a digital ticket 312 can be an electronic discount coupon having an original discount rate of 95%, and the original discount rate can decrease by 5% a week until it reaches a predetermined threshold, for example, 60%. In some examples, a digital ticket 312 can have different values at different time points or periods. For example, a digital ticket 312 can be an electronic voucher having a first monetary value of $10 in January, a second monetary value of $5 in February, and a third monetary value of $15 in March.

Figure 4:
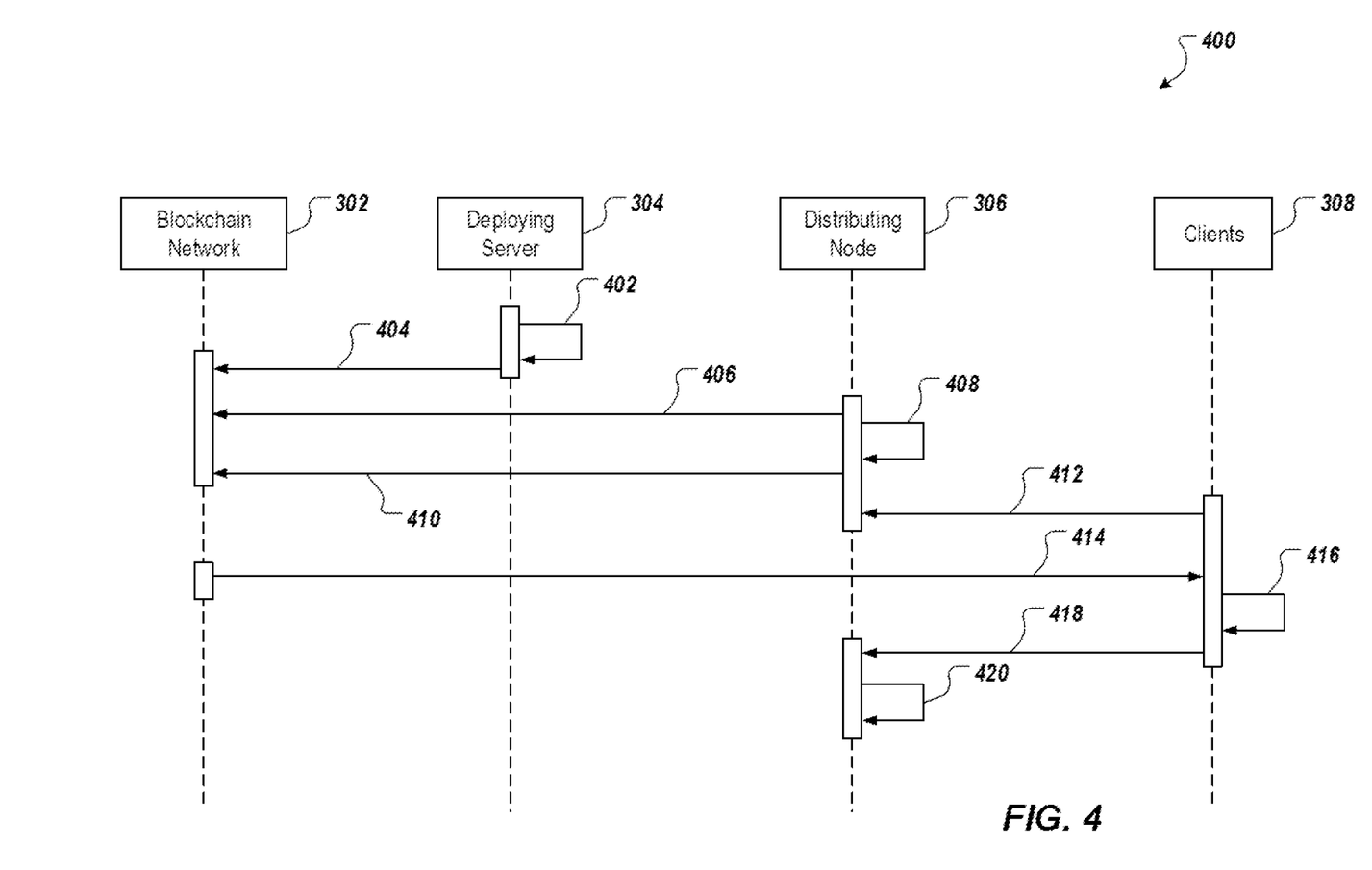
FIG. 4 depicts an example of a signal flow in accordance with embodiments of this specification.

FIG. 4 depicts an example of a signal flow 400 in accordance with embodiments of this specification. The signal flow 400 represents an example a process for determining the value of a digital ticket. For convenience, the process will be described as being performed by a system of one or more computers, located in one or more locations, and programmed appropriately in accordance with this specification. For example, a distributed system (e.g., the environment 100 of FIG. 1; the system 300 of FIG. 3), appropriately programmed, can perform the process.

The deploying server 304 generates (402) smart contracts 310. In some embodiments, the deploying server 304 sets up one or more dynamic ticket templates in one or more of the smart contracts 310 that can be used for creating the digital tickets 312. The deploying server 304 can further define rules in the dynamic ticket templates for dynamically determining values of the digital tickets 312. The deploying server 304 can further add more templates to the smart contracts 310 upon request. In some templates, the rules in the templates include value changing rules for changing the value of a digital ticket 312 generated from the templates, such as rules that associate a growth rate with the value of a digital ticket 312, rules that associate a date with the value of a digital ticket 312, and/or rules that associate a location with the value of a digital ticket 312. Some examples of the rules in the smart contract 310 include increasing the value of a digital ticket 312 as time passes, assigning a certain value to a digital ticket 312 during a specified time period, among others.

The deploying server 304 deploys (404) the smart contracts 310 to the blockchain network. In some examples, the deploying server 304 generates and submits a transaction of smart contract to the blockchain network 302. The transaction of smart contract 310 may include a program and an originator of the smart contract 310. The mining nodes (miners) of the blockchain network 302 verify the transaction of the smart contract 310. After the mining nodes successfully verify the transaction of the smart contract 310, the smart contract 310 can be deployed in the blockchain network 302 in a distributed manner and has a unique smart contract address from which the smart contract 310 can be called.

In some embodiments, the distributing node 306 accesses (406) the blockchain network 302 and obtains the smart contract 310. The distributing node 306 processes the smart contract 310 and registers (creates) an account with the smart contract 310. In some examples, the distributing node 306 generates (408) digital tickets 312 based on the smart contract 310. As noted, the smart contract 310 includes a dynamic ticket template defining a plurality of rules for determining values of the digital tickets 312. The distributing node 306 can use one or more of the rules for creating a digital ticket 312, such that different ticket 312 may be associated with different subsets of the rules. For example, one digital ticket 312 may be associated with a rule that increases the value of the ticket 312 over time from when the ticket 312 is submitted for redeeming the ticket. As another example, another digital ticket 312 may be associated with another rule that endows the ticket 312 a maximum value during a specified time window.

In some embodiments, the digital tickets 312 are stored in the blockchain network 302 in a distributed manner. In some examples, a digital ticket 312 has an original value. Each digital ticket 312 is associated with one or more of the rules. In some examples, the rules are assigned to the digital ticket 312 during creation of the tickets 312, or can be assigned to the digital ticket 312 by an operator after the creation of the tickets 312. In some embodiments, the rules that are assigned to a digital ticket 312 may not be tampered with or invalidated. In some examples, the rules that are assigned to a digital ticket 312 may be tampered or invalidated upon approval of a certificate authority. Different rules and/or subsets of the rules that are assigned to the digital tickets 312 reflect different value endowments of the tickets 312. A client 308 can select one or more of the rules associated with a digital ticket 312 when the client 308 redeems the digital ticket 312.

In some embodiments, the distributing node 306 can apply value change strategy on the rules of the digital tickets 312. In some examples, the value change strategy allows the value of the digital tickets 312 to change based on time. For example, rules based on the value change strategy can allow value of a digital ticket 312 to increase gradually over time until reaching a maximum value. A client 308 selecting such rule for redeeming the digital ticket 312 can wait until the value of the digital ticket 312 to be the maximum to obtain a full value of the ticket 312. As another example, rules based on the value change strategy can allow value of a digital ticket 312 to be a certain value during a specified time window. For example, the value of the digital ticket 312 can have a maximum value during a specified time window but has only a fraction of the maximum value outside the time window. A client 308 selecting such rule for the digital ticket 312 can redeem the digital ticket 312 during the specified time window to obtain a full value of the ticket 312. In some embodiments, the value change strategy allows the rules to associate a growth rate with the value of the digital tickets 312. For examples, the value of a digital ticket 312 associated with the rules can increases over time with a specified growth rate. In some embodiments, the value change strategy allows the rules to associate a date with the value of the digital tickets 312. For example, the value of a digital ticket 312 associated with the rules can have a value at a specified date. In some embodiments, the value change strategy allows the rules to associate a location with the value of the digital tickets 312. For example, the value of a digital ticket 312 associated with the rules can have a value at a specified location.

In some embodiments, the distributing node 306 can apply correlation value change strategy on the rules of the digital tickets 312 when generating the digital tickets 312. In some examples, rules based on the correlation value change strategy can allow other values that are correlated to the value of the digital ticket 312 to change with time or location or other factors. In some embodiments, the distributing node 306 can add additional rules to the digital ticket 312 after the generation of the tickets 312. In some examples, the additional rules can include rules that change the value of the digital tickets 312, and rules that associate other digital tickets 312 to an existing digital ticket 312 and that assign the associated digital tickets 312 to client 308 who holds the existing digital ticket 312.

The distributing node 306 publishes (410) the digital tickets 312. In some embodiments, the distributing node 306 implements a digital distributing platform and posts the digital tickets 312 on the platform where the tickets 312 are made available to the clients 308. As noted, the digital tickets 312 are stored in the blockchain network 302 in a distributed manner. A client 308 who wants to obtain a digital ticket 312 may send request to the distributing node 306 and obtain the digital ticket 312 from the blockchain network 302 upon approval from the distributing node 306.

A client 308 requests (412) a digital ticket 312 from the distributing node 306. As noted, the distributing node 306 may implement a digital distributing platform and the client 308 can send a request for digital tickets 312 to the digital distributing platform. In some embodiments, the distributing node 306 returns a link or an address of the requested digital tickets 312 in the blockchain network 302. The client 308 can obtain (414) the digital tickets 312 from the blockchain network using the link or the address.

In some embodiments, the client 308 processes (416) the digital tickets 312 to inspect the rules for determining the value of the tickets 312. The client 308 can select one or more of the rules of the ticket 312 for endowing a value to the ticket 312. For example, the client 308 can select a rule that increases the value of the ticket 312 gradually over time, or can select a rule that endows a certain value to the ticket 312 during a specified time window.

The client 308 submits (418) the digital tickets 312 to the distributing node 306 when the client 308 redeems the digital tickets 312. In some examples, the client 308 sends a request to the distributing node 306, the request indicating that the client 308 wants to redeem a digital ticket 312 that the client previously obtained from the distributing node 306 and including the digital ticket 312 and one or more rules selected by the client 308. The request can also include a timestamp indicating when the client 308 submitted the request to the distributing node 306.

The distributing node 306 processes (420) the request from the client 308. As noted, the request from the client 308 can include a digital ticket 312 and one or more rules and a timestamp. The distributing node 306 can determine the value of the digital ticket 312 based on the rules and the timestamp. In some embodiments, the distributing node 306 makes a smart contract call to a smart contract this was used for generating the digital ticket 312. As noted, the smart contract 310 includes a dynamic ticket template that defines a number of rules for determining value of the digital ticket 312, where the number of rules include the rules in the digital ticket 312. The smart contract 310 executes itself using the timestamp and the rules in the smart contract that are the same as the rules that were selected by the client in the digital ticket 312. For example, the smart contract 310 can use the timestamp to determine when the client 308 submitted the digital ticket 312 and compute a value of the digital ticket 312 using the rules based on a value change strategy. In some examples, the computed value of the digital ticket 312 can be deducted from an account of the distributing node 306 and added to an account of the client 308, and the digital ticket 312 is successfully redeemed.

Figure 5:
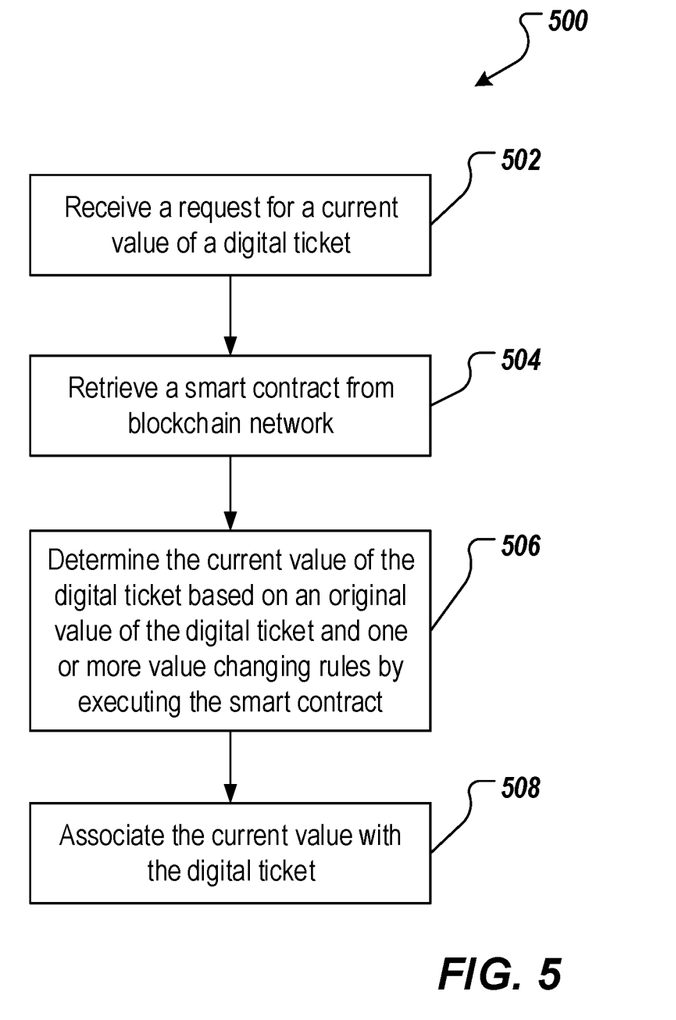
FIG. 5 depicts an example of a process that can be executed in accordance with embodiments of this specification.

FIG. 5 depicts an example of a process 500 for processing a request for a current value of a digital ticket using a smart contract in a blockchain network. The process 500 may be performed using one or more computer-executable programs executed using one or more computing devices. In some examples, the process 500 can be performed by a distributed system (e.g., the environment 100 of FIG. 1; the system 300 of FIG. 3) for processing a request for a current value of a digital ticket.

Process 500 starts at 502 where a distributing node 306 receives a request from a client device 308 for a current value of a digital ticket 312. The request indicates that the client device 308 wants to redeem the digital ticket 312 and obtain the current value of the digital ticket 312. In some embodiment, the request can include the digital ticket 312 and one or more value changing rules for determining the current value of the digital ticket 312. In some embodiments, the one or more value changing rules can include a value changing rule that associates a growth rate with the current value of the digital ticket, a value changing rule that associates a date with the current value of the digital ticket, and/or or a value changing rule that associates a location with the current value of the digital ticket.

In some embodiments, the digital ticket 312 is associated with multiple value changing rules and the client device 308 can specify one or more of the multiple value changing rules and include them in the request. In some embodiments, the request further includes a timestamp indicating when the client device 308 submits the request to the distributing node 306.

In some embodiments, the digital ticket 312 has an original value. For example, the digital ticket 312 can be an electronic discount coupon having an original discount value of 90%. As another example, the digital ticket 312 can be an electronic voucher having an original monetary value of $10.

At 504, the distributing node 306 retrieves a smart contract 310 from a blockchain network 302 in response to receiving the request from the client device 308. In some embodiments, the distributing node is located external to the blockchain network 302 and can communicate with the blockchain network 302 via a network connection. In some embodiments, the distributing node 306 makes a contract call to the smart contract 310 from the blockchain network 302. In some embodiments, the smart contract 310 includes a number of value changing rules and the one or more changing rules in the request is a subset of the number of value changing rules.

At 506, the distributing node 306 determines the current value of the digital ticket 312 based on the original value of the digital ticket 312 and one or more value changing rules by executing the smart contract 310. In some embodiments, the distributing node 306 executes the smart contract 310 using the original value of the digital ticket 312 and the one or more value changing rules specified in the request. In some embodiments, the distributing node 306 executes the smart contract 310 using the original value of the digital ticket 312, the one or more value changing rules specified in the request, and a timestamp in the request. For example, the digital ticket 312 can be an electronic discount coupon having an original discount value of 90%, and the request can include a value changing rule indicating that the discount value of the digital ticket 312 decreases by 5% per week until it reaches 60%. In such case, a current discount value of the digital ticket 312 can be determined based on the original discount value, the value changing rules, the timestamp in the request, and a time point when the digital ticket 312 was distributed to the client device 308.

At 508, the distributing node 306 associates the current value of the digital ticket 312 as determined at step 506 with the digital ticket 312. For example, the distributing node 306 can assign the current value as determined at step 506 to the digital ticket 312. Continue with the above example, the digital ticket 312 having an original discount value of 90% can be assigned a current discount value of 75% by executing the smart contract 310 based on the original discount value, the value changing rule, the timestamp in the request, and a time point when the digital ticket 312 was distributed to the client device 308.

Figure 6:
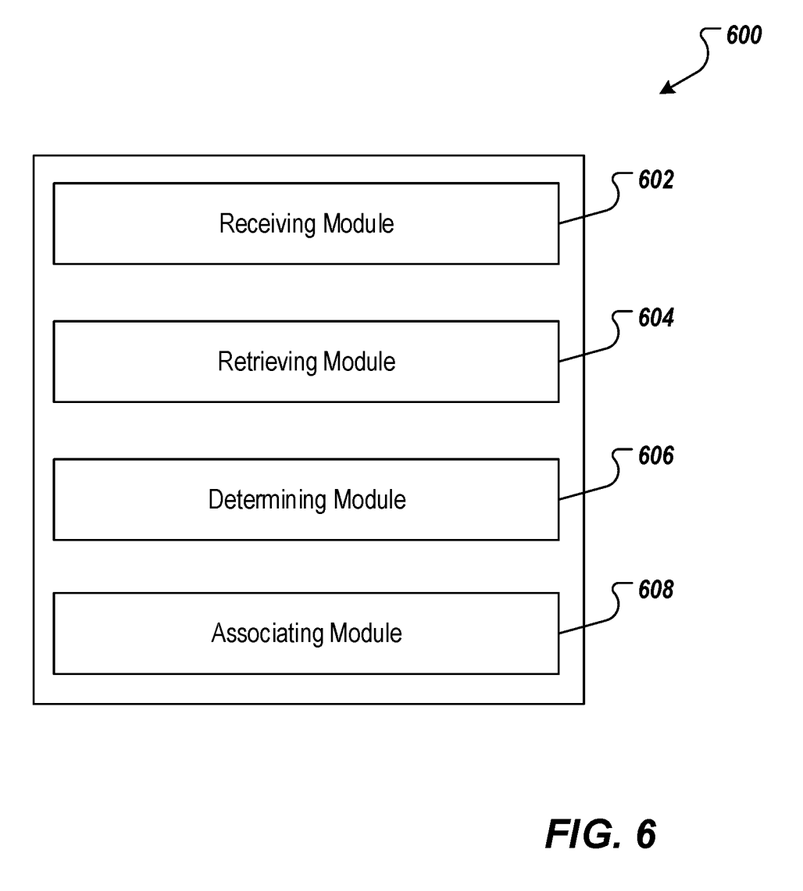
FIG. 6 depicts examples of modules of an apparatus in accordance with embodiments of this specification.

FIG. 6 is a diagram of an example of modules of an apparatus 600 in accordance with embodiments of this specification. The apparatus 600 can be an example of an embodiment of a distributing node. In some examples, the distributing node receives a request for a current value of a digital ticket from a client and determines the value based on value changing rules using smart contract from a blockchain network.

The apparatus 600 can correspond to the embodiments described above, and the apparatus 600 includes the following: a receiving module 602 that receives a request from a client device for a current value of a digital ticket, wherein the request includes the digital ticket and one or more value changing rules for determining the current value of the digital ticket, wherein the digital ticket has an original value; a retrieving module 604 that retrieves a smart contract from the blockchain network in response to receiving the request from the client device, wherein the smart contract includes the one or more value changing rules for determining the current value of the digital ticket; a determining module 606 that determines the current value of the digital ticket based at least in part on the original value of the digital ticket and the one or more value changing rules by executing the smart contract; and an associating module 608 that associates the current value with the digital ticket.

In an optional embodiment, the request includes a timestamp of the digital ticket, and the current value of the digital ticket is determined further based on the timestamp.

In an optional embodiment, the one or more value changing rules include a value changing rule that associates a growth rate with the value of the digital ticket.

In an optional embodiment, the one or more value changing rules include a value changing rule that associates a date with the value of the digital ticket.

In an optional embodiment, the one or more value changing rules include a value changing rule that associates a location with the value of the digital ticket.

In an optional embodiment, the smart contract includes a number of value changing rules, and where the one or more value changing rules is a subset of the number of value changing rules.

In an optional embodiment, the distributing node is located external to the blockchain network.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 6, it can be interpreted as illustrating an internal functional module and a structure of a digital ticket value retrieving apparatus. The digital ticket value retrieving apparatus can be an example of a distributing node configured to retrieve a current value of a digital ticket. An execution body in essence can be an electronic device, and the electronic device includes the following: one or more processors; and a memory configured to store an executable instruction of the one or more processors.

The techniques described in this specification produce one or more technical effects. In some embodiments, current values of digital tickets can be dynamically determined based on different value changing rules specified by users. In some embodiments, a digital ticket can reach a maximum value at different dates, or at different locations based on the value changing rules specified by the users in the request. This facilitates encouraging the users to redeem the digital tickets at different dates or locations, thereby alleviating the pressure on the computer systems that process the requests from the users to redeem the digital tickets. Furthermore, the values of the digital tickets can be determined using a smart contract from the blockchain network. The smart-contract can be used to implement trusted transactions that are trackable, irreversible, and tamper resistant, without involving the third parties. This ensures a secure and trusted value determining process for the digital tickets. The autonomous execution capacities of smart contracts extends the transactional security assurance of blockchain into situations where complex and dynamic value retrieval of the digital tickets are needed. In some cases, the smart contracts can be executed without a third party (e.g., without an arbitrating program or an intermediary program) in between the clients and the distributing node for retrieving values of the digital tickets. This approach can save computing and network resources (e.g., network bandwidth) for the value retrieval process.

Described embodiments of the subject matter can include one or more features, alone or in combination. For example, in a first embodiment, a distributing node receives a request from a client device for a current value of a digital ticket, the request including the digital ticket and one or more value changing rules for determining the current value of the digital ticket, wherein the digital ticket has an original value. The distributing node retrieves a smart contract from the blockchain network in response to receiving the request from the client device, the smart contract including the one or more value changing rules for determining the current value of the digital ticket. The distributing node determines the current value of the digital ticket based at least in part on the original value of the digital ticket and the one or more value changing rules by executing the smart contract, and associates the current value with the digital ticket. The foregoing and other described embodiments can each, optionally, include one or more of the following features:

A first feature, combinable with any of the following features, specifies that the request includes a timestamp of the digital ticket, and the current value of the digital ticket is determined further based on the timestamp.

A second feature, combinable with any of the following features, specifies that the one or more value changing rules include a value changing rule that associates a growth rate with the value of the digital ticket.

A third feature, combinable with any of the following features, specifies that the one or more value changing rules include a value changing rule that associates a date with the value of the digital ticket.

A fourth feature, combinable with any of the following features, specifies that the one or more value changing rules include a value changing rule that associates a location with the value of the digital ticket.

A fifth feature, combinable with any of the following features, specifies that the smart contract includes a number of value changing rules, and where the one or more value changing rules is a subset of the number of value changing rules.

A sixth feature, combinable with any of the following features, specifies that the distributing node is located external to the blockchain network.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
transmitting, by a distributing node computer and to a blockchain network, a first call request comprising a unique smart contract address at which a smart contract is stored in the blockchain network;
receiving, by the distributing node computer and from the blockchain network, the smart contract stored at the unique smart contract address;
selecting, by the distributing node computer, a first ticket template of a plurality of ticket templates stored in the smart contract, the first ticket template comprising one or more value changing rules for determining changes in ticket value, wherein the one or more value changing rules included in the first ticket template are a strict subset of a plurality of value changing rules included in the plurality of ticket templates;
generating, by the distributing node computer, a digital ticket based on the smart contract, wherein the digital ticket includes an original value that changes according to the one or more value changing rules, and wherein the one or more value changing rules are included in the digital ticket;
storing, by the distributing node computer, the digital ticket in the blockchain network, wherein storing the digital ticket comprises initiating a distributed consensus procedure among a plurality of blockchain node computers in the blockchain network, the distributed consensus procedure resulting in the digital ticket being stored among the plurality of blockchain node computers in a distributed manner at a second address in the blockchain network;
providing, by the distributing node computer and to a client device, the second address or a link to the digital ticket stored at the second address;
receiving, by the distributing node computer and from the client device, a request to redeem the digital ticket, wherein the request to redeem the digital ticket includes the digital ticket to be redeemed and a selection of at least one value changing rule of the one or more value changing rules that are included in the digital ticket;
after receiving the request from the client device, transmitting, by the distributing node computer and to the blockchain network, a second call request comprising the unique smart contract address;
receiving, by the distributing node computer and from the blockchain network, the smart contract;
executing, by the distributing node computer, the smart contract in accordance with the selection of the at least one value changing rule included in the request to redeem the digital ticket;
determining, by the distributing node computer, based on executing the smart contract, a current value of the digital ticket; and
providing, by the distributing node computer, the current value in response to the request to redeem the digital ticket.

2. The method of claim 1, wherein the digital ticket comprises a gift certificate and the current value comprises a currency amount.

3. The method of claim 1, wherein the digital ticket comprises a coupon and the current value comprises a percentage discount.

4. The method of claim 1, wherein the request to redeem the digital ticket further includes one or more other value changing rules.

5. The method of claim 1, wherein the one or more value changing rules comprise a rule for increasing the current value of the digital ticket over time.

6. The method of claim 1, wherein the request to redeem the digital ticket further includes a timestamp, and wherein the current value of the digital ticket is further based on the timestamp.

7. The method of claim 1, wherein the request to redeem the digital ticket further includes a location, and wherein the current value of the digital ticket is further based on the location.

8. A non-transitory, computer-readable storage medium storing one or more instructions that, when executed by one or more processors of a distributing node computer, cause the distributing node computer to perform operations comprising:
transmitting, by the distributing node computer and to a blockchain network, a first call request comprising a unique smart contract address at which a smart contract is stored in the blockchain network;

receiving, by the distributing node computer and from the blockchain network, the smart contract stored at the unique smart contract address;

selecting, by the distributing node computer, a first ticket template of a plurality of ticket templates stored in the smart contract, the first ticket template comprising one or more value changing rules for determining changes in ticket value, wherein the one or more value changing rules included in the first ticket template are a strict subset of a plurality of value changing rules included in the plurality of ticket templates;

generating, by the distributing node computer, a digital ticket based on the smart contract, wherein the digital ticket includes an original value that changes according to the one or more value changing rules, and wherein the one or more value changing rules are included in the digital ticket;

storing, by the distributing node computer, the digital ticket in the blockchain network, wherein storing the digital ticket comprises initiating a distributed consensus procedure among a plurality of blockchain node computers in the blockchain network, the distributed consensus procedure resulting in the digital ticket being stored among the plurality of blockchain node computers in a distributed manner at a second address in the blockchain network;

providing, by the distributing node computer and to a client device, the second address or a link to the digital ticket stored at the second address;

receiving, by the distributing node computer and from the client device, a request to redeem the digital ticket, wherein the request to redeem the digital ticket includes the digital ticket to be redeemed and a selection of at least one value changing rule of the one or more value changing rules that are included in the digital ticket;

after receiving the request from the client device, transmitting, by the distributing node computer and to the blockchain network, a second call request comprising the unique smart contract address;

receiving, by the distributing node computer and from the blockchain network, the smart contract;

executing, by the distributing node computer, the smart contract in accordance with the selection of the at least one value changing rule included in the request to redeem the digital ticket;

determining, by the distributing node computer, based on executing the smart contract, a current value of the digital ticket; and providing, by the distributing node computer, the current value in response to the request to redeem the digital ticket.

9. The non-transitory, computer-readable storage medium of claim 8, wherein the digital ticket comprises a gift certificate and the current value comprises a currency amount.

10. The non-transitory, computer-readable storage medium of claim 8, wherein the digital ticket comprises a coupon and the current value comprises a percentage discount.

11. The non-transitory, computer-readable storage medium of claim 8, wherein the request to redeem the digital ticket further includes one or more other value changing rules.

12. The non-transitory, computer-readable storage medium of claim 8, wherein the one or more value changing rules comprise a rule for increasing a value of the digital ticket over time.

13. The non-transitory, computer-readable storage medium of claim 8, wherein the request to redeem the digital ticket further includes a timestamp, and wherein the current value of the digital ticket is further based on the timestamp.

14. The non-transitory, computer-readable storage medium of claim 8, wherein the request to redeem the digital ticket further includes a location, and wherein the current value of the digital ticket is further based on the location.

15. A computer-implemented system, comprising:
one or more computers of a distributing node; and
one or more computer memory devices interoperably coupled with the one or more computers and having tangible, non-transitory, machine-readable media storing one or more instructions that, when executed by the one or more computers, cause the distributing node to perform one or more operations comprising:

transmitting, by the distributing node and to a blockchain network, a first call request comprising a unique smart contract address at which a smart contract is stored in the blockchain network;

receiving, by the distributing node and from the blockchain network, the smart contract stored at the unique smart contract address;

selecting, by the distributing node, a first ticket template of a plurality of ticket templates stored in the smart contract, the first ticket template comprising one or more value changing rules for determining changes in ticket value, wherein the one or more value changing rules included in the first ticket template are a strict subset of a plurality of value changing rules included in the plurality of ticket templates;

generating, by the distributing node, a digital ticket based on the smart contract, wherein the digital ticket includes an original value that changes according to the one or more value changing rules, and wherein the one or more value changing rules are included in the digital ticket;

storing, by the distributing node, the digital ticket in the blockchain network, wherein storing the digital ticket comprises initiating a distributed consensus procedure among a plurality of blockchain node computers in the blockchain network, the distributed consensus procedure resulting in the digital ticket being stored among the plurality of blockchain node computers in a distributed manner at a second address in the blockchain network;

providing, by the distributing node and to a client device, the second address or a link to the digital ticket stored at the second address;

receiving, by the distributing node and from the client device, a request to redeem the digital ticket, wherein the request to redeem the digital ticket includes the digital ticket to be redeemed and a selection of at least one value changing rule of the one or more value changing rules that are included in the digital ticket;

after receiving the request from the client device, transmitting, by the distributing node and to the blockchain network, a second call request comprising the unique smart contract address;

receiving, by the distributing node and from the blockchain network, the smart contract;

executing, by the distributing node, the smart contract in accordance with the selection of the at least one value changing rule included in the request to redeem the digital ticket;

determining, by the distributing node, based on executing the smart contract, a current value of the digital ticket; and providing, by the distributing node, the current value in response to the request to redeem the digital ticket.

16. The computer-implemented system of claim 15, wherein the digital ticket comprises a gift certificate and the current value comprises a currency amount.

17. The computer-implemented system of claim 15, wherein the digital ticket comprises a coupon and the current value comprises a percentage discount.

18. The computer-implemented system of claim 15, wherein the request to redeem the digital ticket further includes one or more other value changing rules.

19. The computer-implemented system of claim 15, wherein the one or more value changing rules comprise a rule for increasing a value of the digital ticket over time.

20. The computer-implemented system of claim 15, wherein the request to redeem the digital ticket further includes a timestamp, and wherein the current value of the digital ticket is further based on the timestamp.

21. The computer-implemented system of claim 15, wherein the request to redeem the digital ticket further includes a location, and wherein the current value of the digital ticket is further based on the location.

* * * * *

UNITED STATES PATENT AND TRADEMARK OFFICE
CERTIFICATE OF CORRECTION

Page 1 of 1

PATENT NO. : 11,087,346 B2
APPLICATION NO. : 16/671032
DATED : August 10, 2021
INVENTOR(S) : Zhiyuan Feng, Yanpeng Li and Long Cheng It is certified that error appears in the above-identified patent and that said Letters Patent is hereby corrected as shown below:

On the Title Page

Column 2, Line 2, Other Publications, delete "Technica" and insert -- Technical --, therefor.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*